United States Patent
Gao

(10) Patent No.: US 10,148,168 B2
(45) Date of Patent: *Dec. 4, 2018

(54) POWER SUPPLY HAVING HIGH POWER FACTOR AND LOW STANDBY POWER CONSUMPTION

(71) Applicant: Gardenia Industrial Limited, Road Town, Tortola (VG)

(72) Inventor: Bo Gao, Zhongshan (CN)

(73) Assignee: Gardenia Industrial Limited, Road Town (VG)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,082

(22) Filed: Jul. 18, 2017

(65) Prior Publication Data

US 2017/0317578 A1 Nov. 2, 2017

Related U.S. Application Data

(63) Continuation of application No. 15/153,608, filed on May 12, 2016, now Pat. No. 9,735,669.

(30) Foreign Application Priority Data

Dec. 11, 2015 (CN) .......................... 2015 1 0917091
Dec. 11, 2015 (CN) ...................... 2015 2 1028180 U

(51) Int. Cl.
*H05B 41/36* (2006.01)
*H05B 37/02* (2006.01)
(Continued)

(52) U.S. Cl.
CPC ........... *H02M 1/4208* (2013.01); *H02M 3/26* (2013.01); *H05B 33/0815* (2013.01); *H05B 33/0845* (2013.01)

(58) Field of Classification Search
CPC ............ H05B 33/0815; H05B 33/0851; H05B 33/0845; H05B 33/0824; H05B 37/029; H05B 37/02; H05B 41/36
(Continued)

(56) References Cited

U.S. PATENT DOCUMENTS

2005/0024895 A1 2/2005 Mabanta et al.
2014/0091720 A1 4/2014 Brinlee
(Continued)

OTHER PUBLICATIONS

Maxim, "DC-DC Converter Tutorial," Sep. 10, 2014.
(Continued)

*Primary Examiner* — Wei Chan
(74) *Attorney, Agent, or Firm* — Lewis Roca Rothgerber Christie LLP

(57) ABSTRACT

A power supply circuit includes: an anti-electromagnetic interference circuit configured to receive input alternating current power and to output filtered alternating current power; a rectifier circuit configured to rectify the filtered alternating current power; a current correction circuit configured to perform passive power factor correction on the rectified alternating current power; a single-ended flyback converter circuit coupled to the output of the current correction circuit; and a dimming control circuit coupled between the output of the single-ended flyback converter circuit and a light load, wherein the current correction circuit is configured to control a waveform of the rectified alternating current power to follow a current output to the light load in order to provide passive power factor correction.

8 Claims, 5 Drawing Sheets

(51) Int. Cl.
*H05B 33/08* (2006.01)
*H02M 1/42* (2007.01)
*H02M 3/26* (2006.01)

(58) Field of Classification Search
USPC ........ 315/307, 224, 200 R, 297, 185 R, 201, 315/210, 291
See application file for complete search history.

(56) References Cited

U.S. PATENT DOCUMENTS

2015/0137694 A1* 5/2015 Hong ................ H05B 33/0815
315/205
2016/0143104 A1 5/2016 Chen et al.

OTHER PUBLICATIONS

R.C. Dorf and J.A. Svoboda, "Thevenin Equivalent Circuits," Sep. 2, 2012.
"Voluntary California Quality Light-Emitting Diode (LED) Lamp Specification," Final Staff Report, California Energy Commission, Edmund G. Brown, Jr., Governor, CEC-400-2012-016-SF, Dec. 2012, 62 pages.

* cited by examiner

POWER SUPPLY HAVING HIGH POWER FACTOR AND LOW STANDBY POWER CONSUMPTION

CROSS-REFERENCE TO RELATED APPLICATION(S)

This application is a continuation of U.S. application Ser. No. 15/153,608, filed on May 12, 2016, which claims priority to Chinese Patent Application No. 201521028180.0, filed in the State Intellectual Property Office of the People's Republic of China on Dec. 11, 2015 and priority to Chinese Utility Model Patent Application No. 201510917091.X, filed in the State Intellectual Property Office of the People's Republic of China on Dec. 11, 2015, the entire disclosures of which are incorporated herein by reference.

BACKGROUND

1. Field

Aspects of embodiments of the present invention relate to power electronics, more specifically power electronics having high power factor and low standby power consumption.

2. Related Art

One comparative design of a single-ended flyback converter circuit cannot achieve power factor greater than 0.7. Another comparative design includes active power factor correction (APFC) and a single-stage or a double-stage single-ended flyback converter circuit, but this circuit also has limitations and may be unable to meet energy efficiency standards such as no-load power consumption of less than 0.1 W. Therefore, comparative circuit designs may not be able to meet various power consumption design requirements imposed by current standards (e.g., California Energy Commission standards for efficiency of portable luminaries and U.S. Department of Energy (DOE) Level VI standards).

SUMMARY

Aspects of embodiments of the present invention are directed to a single-ended flyback converter circuit with passive power factor correction (PPFC) circuit capable of achieving no-load power consumption less than 0.1 W, and the power efficiency of greater than 81.81%.

According to one embodiment of the present invention, a power supply circuit includes: an anti-electromagnetic interference circuit configured to receive input alternating current power and to output filtered alternating current power; a rectifier circuit configured to rectify the filtered alternating current power; a current correction circuit configured to perform passive power factor correction on the rectified alternating current power; a single-ended flyback converter circuit coupled to the output of the current correction circuit; and a dimming control circuit coupled between the output of the single-ended flyback converter circuit and a light load, wherein the current correction circuit is configured to control a waveform of the rectified alternating current power to follow a current output to the light load in order to provide passive power factor correction.

The current correction circuit may include: a first discharge circuit including a first electrolytic capacitor coupled in series with a first diode and a first node between the first electrolytic capacitor and the first diode; a second discharge circuit including a second electrolytic capacitor coupled in series with a second diode and a second node between the second electrolytic capacitor and the second diode, the first discharge circuit and the second discharge circuit being coupled in parallel across an output of the rectifier circuit; and a third diode coupled between the first node and the second node.

The single-ended flyback converter circuit may include: a power supply controller; an output transformer coupled to the power supply controller; a secondary transformer coupled to the output transformer; an optocoupler coupled between the power supply controller and the secondary transformer; and a dimming control circuit coupled to the secondary transformer and configured to provide dimming control.

The single-ended flyback converter circuit may further include: an RCD snubber circuit coupled between the current correction circuit and the output transformer and coupled to the power supply controller.

The RCD snubber circuit may include: a first resistor; a second resistor; a capacitor; and a diode, wherein the first resistor, the second resistor, and the capacitor are coupled in parallel between the current correction circuit and a cathode of the diode of the RCD snubber circuit, and wherein an anode of the diode of the RCD snubber circuit is coupled to the power supply controller.

The dimming control circuit may include: a three-terminal integrated voltage regulator; a dimming controller coupled to the three-terminal integrated voltage regulator; a MOS transistor; and a load output terminal.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Figure 1:
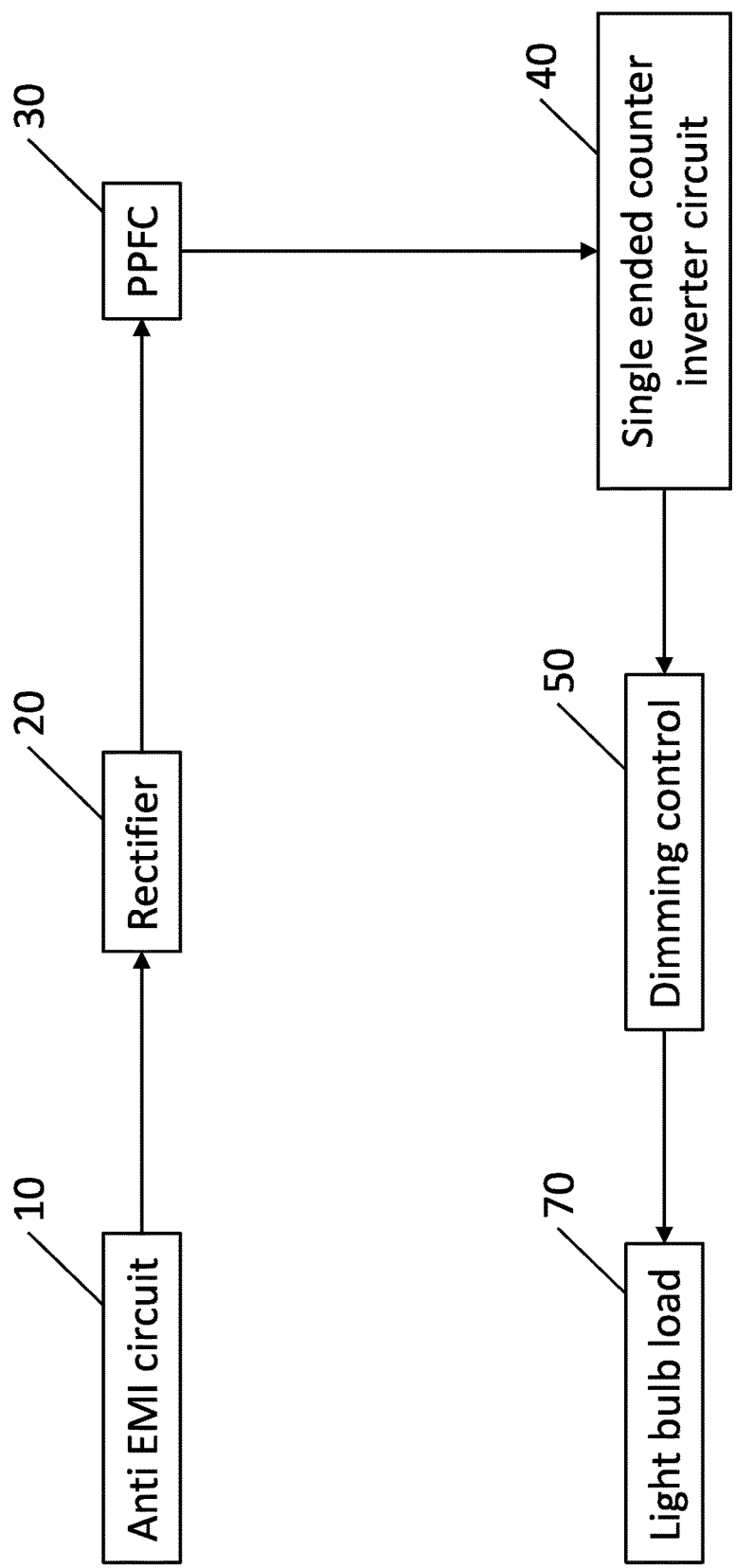
FIG. 1 is a block diagram of energy-saving circuitry according to one embodiment of the present invention.

Referring to the block diagram of FIG. 1, a high power factor, ultra low standby power consumption energy-saving circuit includes, starting from an input terminal, sequentially connected blocks from an anti-electromagnetic interference (EMI) circuit 10, a rectifier circuit 20, a current correction circuit 30 (which may be considered a power factor correction or PFC circuit, and which may perform passive power factor correction or PPFC on the input power), a single-ended flyback converter circuit 40, a dimming control circuit 50, where the output of the dimming control circuit 50 is connected to a load 70 (e.g., a light emitting diode light bulb), where the PPFC by the current correction circuit 30 controls the input current to follow output waveform changing circuit in order to reduce the output current waveform distortion.

Figure 2:
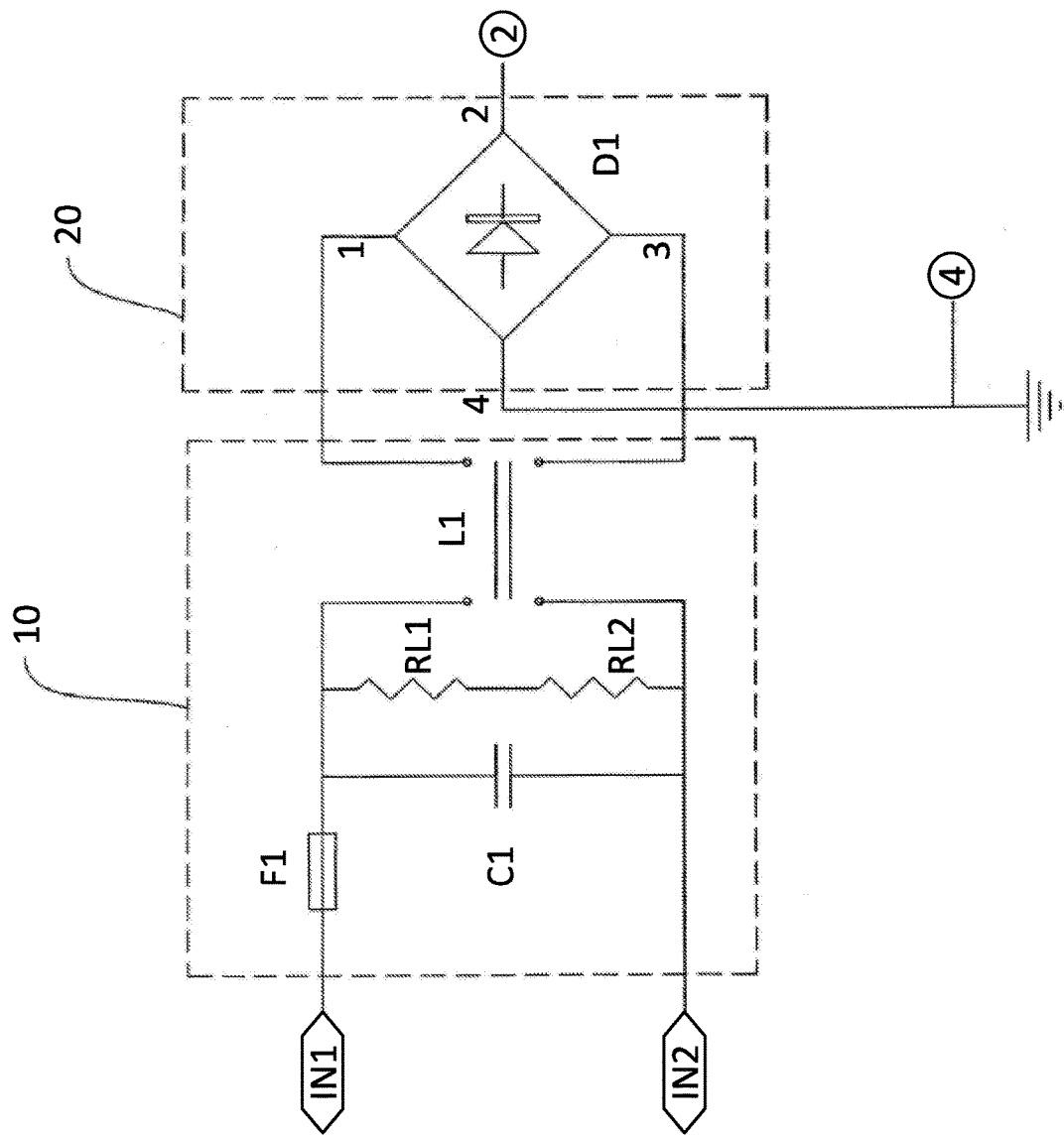
FIG. 2 is circuit diagram illustrating an anti-electromagnetic interference circuit and the rectifier circuit according to one embodiment of the present invention.

As shown in FIG. 2, in one embodiment of the present invention, the input terminal of the anti-electromagnetic interference circuit 10 is connected to AC power through terminals IN1 and IN2, where fuse F1 is connected between the two input terminals IN1 and IN2. A capacitor C1 is coupled in parallel with resistors RL1, RL2 and in series with inductance L1 to form an RLC (or RC) filter circuit, and the output of the filter circuit 10 is connected to a rectifier circuit 20 (e.g., terminals labeled 1 and 3), which includes a full bridge rectifier circuit D1, which has output terminals 2 and 4.

Figure 3:
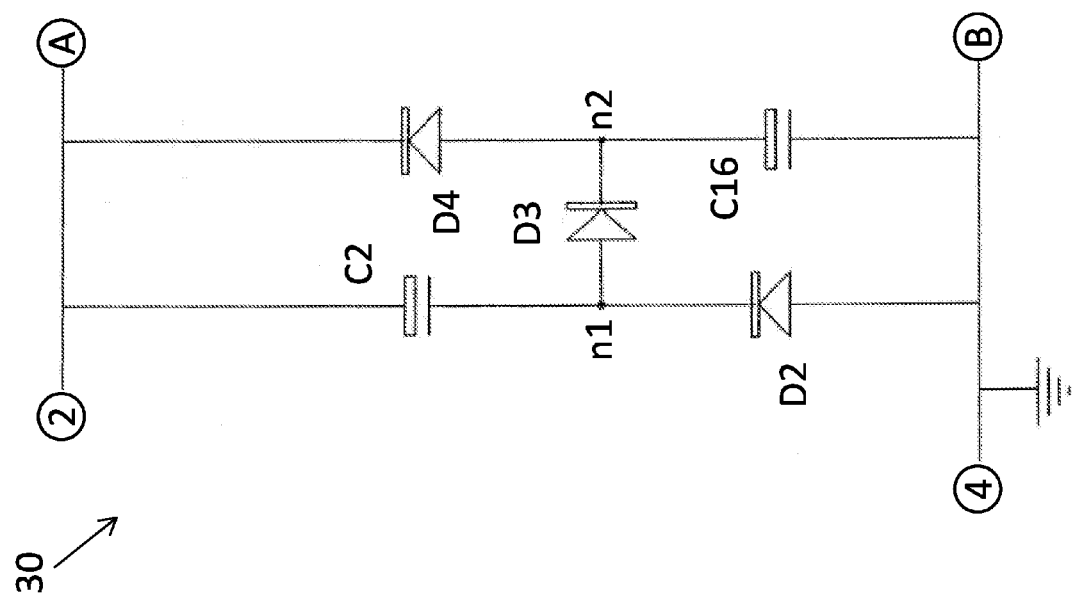
FIG. 3 is a circuit diagram illustrating a current correction circuit according to one embodiment of the present invention.

As shown in FIG. 3, according to one embodiment of the present invention, the PPFC by the current correction circuit 30 includes a first discharge circuit and a second discharge circuit coupled in parallel between the output terminals 2 and 4 of the rectifier circuit 20 and between the input terminals A and B of the converter circuit 40 (e.g., the current correction circuit 30 has outputs connected to the input terminals A and B of the converter circuit 40), where a first discharge circuit includes an electrolytic capacitor C2 connected in series with a diode D2 (e.g., the diode D2 is directly connected to the capacitor C2), and where the second discharge circuit includes an electrolytic capacitor C16 connected in series with a diode D4 (e.g., the capacitor C16 is directly connected to the diode D4). A first node n1 is between the electrolytic capacitor C2 and the diode D2 of the first discharge circuit, and a second node n2 is between the electrolytic capacitor C16 and diode D4. A diode D3 connects (e.g., is directly connected to) nodes n1 and n2 between the first discharge circuit and the second discharge circuit.

After the input power is rectified by the rectifier circuit 20, the rectified positive half cycle current is input through the capacitor C2, the diode D3, and the capacitor C16, thereby charging the two capacitors C2 and C16. After reaching a positive half cycle peak, the capacitor C2 and the auxiliary discharge diode D2, together with the rear-stage circuit, form a discharge circuit, and the capacitor C2 discharges until the voltage drops to ½ VCC (VCC defined as the total voltage across two fully charged capacitors C2 and C16), at which time capacitor C2 stops discharging, but, at this time, capacitor C16 and diode D4 and the rear-stage circuit form a discharge circuit, capacitor C16 starts discharging. As such, the current correction circuit 30 discharges two capacitors alternately, so that the input current waveform can be continuous, in order to reduce the current distortion, and thereby achieve a power factor greater than 0.7.

In addition to the above discussion, embodiments of the present invention are also directed to a whole circuit proving a high power factor through the application of PPFC specific programs by the current correction circuit 30 and a single-ended flyback converter circuit 40 which are combined to form a control circuit core.

A comparative design of a single-ended flyback converter circuit with low PFC generally cannot achieve a power factor greater than 0.7 and therefore cannot meet certain regulatory standards. For example, the California Energy Commission (CEC) 2015 Appliance Efficiency Regulations (July 2015, CEC-400-2015-021), which require the power factor for portable LED luminaries and portable luminaries with LED light engines with integral heat sink, labeled or sold for residential use, to be greater than or equal to 0.70 (see California Code of Regulations, Title 20 § 1605.3(n)(3), Table N-2). Another comparative circuit design of a single-stage or double-stage single ended flyback converter circuit includes an active power factor correction (APFC) circuit. Although this arrangement can achieve high power factor correction, the minimum power requirements of such a circuit are around 0.2-0.3 W, and therefore these circuits cannot achieve less than 0.1 W of power consumption in a no-load state, and therefore cannot meet certain energy efficiency standards (e.g., the above CEC Regulations or the U.S. Department of Energy (DOE) Level VI energy efficiency standards).

A circuit according to embodiments of the present invention uses PPFC to achieve high power factor correction and also uses the current correction circuit 30 which has low loss (e.g., far less than 0.1 W, and, in the ideal state, can be considered to have no loss). At the same time, the rear stages do not need to end with a power factor corrected single ended flyback converter circuit 40, due to high resistance and very low static losses. After the circuit starts, there is substantially no energy consumed under no load conditions. Therefore, it is possible to achieve, under no-load conditions, a load loss of less than 0.1 W, coupled by the current correction circuit 30 providing PPFC, the total loss provided by the current correction circuit is less than 0.1 W, and therefore embodiments of the present invention can meet the energy efficiency standards such as the Level VI standards of the U.S. Department of Energy and the California Energy Commission regulations for portable luminaries.

Figure 4:
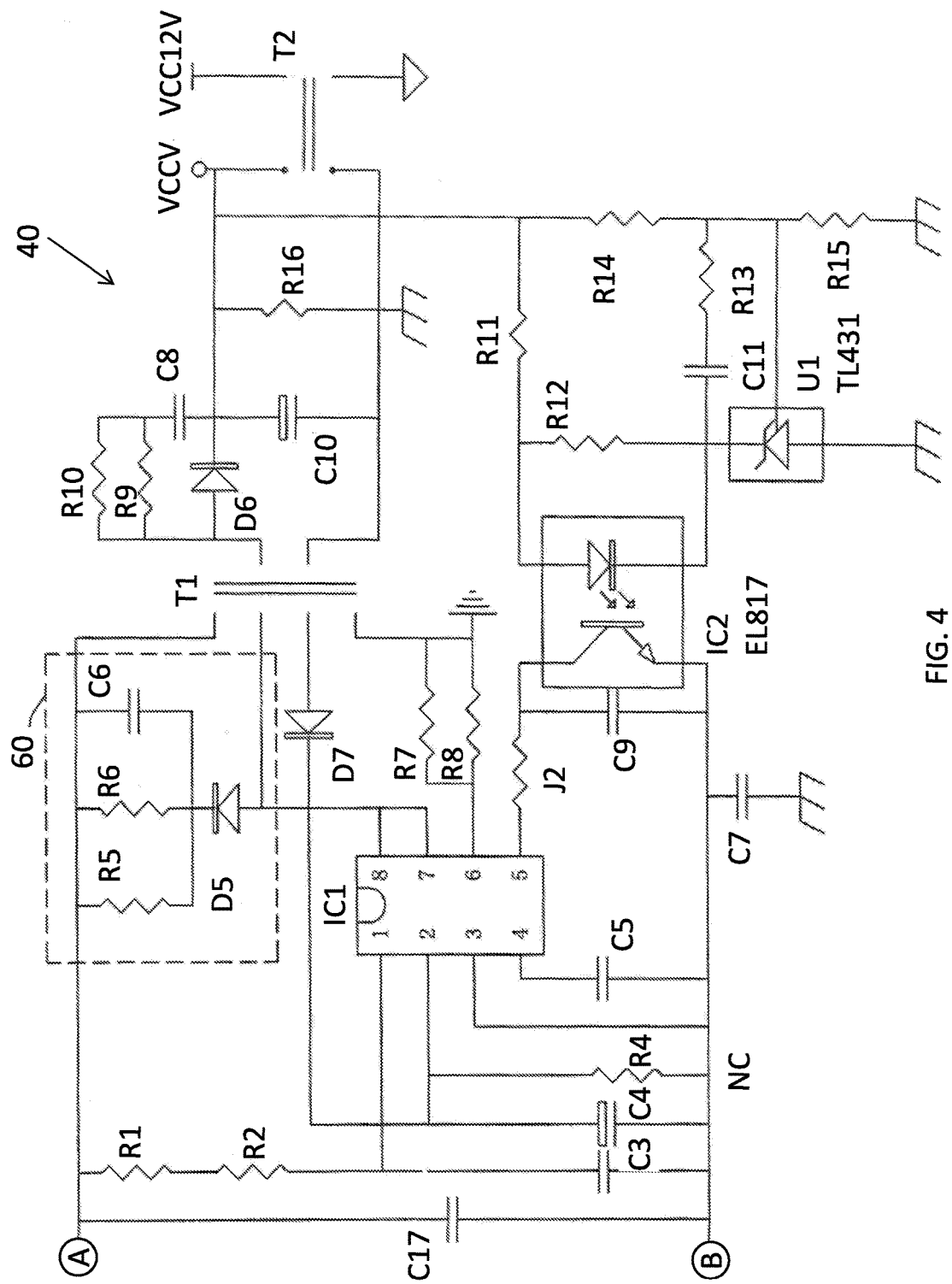
FIG. 4 is a circuit diagram illustrating a single-ended flyback converter circuit according to one embodiment of the present invention.

Referring to FIG. 4, the single ended flyback converter circuit 40 according to one embodiment of the present invention includes a power supply controller IC1 coupled to an output terminal of the output transformer T1, optocoupler IC2, and peripheral basic electronic components. The output transformer T1 is connected, through secondary transformer T2, to dimming control circuit 50, which provides the working voltage of the dimming control circuit 50 and the driving voltage of the load 70. The output is fed back to output transformer T1 (e.g., through the power supply controller IC1) via optocoupler IC2, which provides optical isolation between the output and the primary side of the output transformer T1 (and the power supply controller IC1). The single ended flyback converter circuit 40 is coupled to the output of the current correction circuit 30 via input terminals A and B (e.g., the single ended flyback converter circuit 40 receives input power from the current correction circuit 30).

In addition, the single-ended flyback converter circuit 40 also includes a resistor capacitor diode (RCD) snubber circuit 60 configured to absorb voltage spikes, where the RCD snubber circuit 60 is connected between the output terminal of the PPFC 30 and the input end (or primary side) of the output transformer T1, and is also connected to the power supply controller IC1.

The RCD snubber circuit 60 includes resistor R5, resistor R6, capacitor C6, and diode D5, where resistor R5, resistor R6, and capacitor C6 are connected in parallel between the output terminal of the current correction circuit 30 and the cathode of diode D5, where the anode of diode D5 is connected to the power supply controller IC1.

Figure 5:
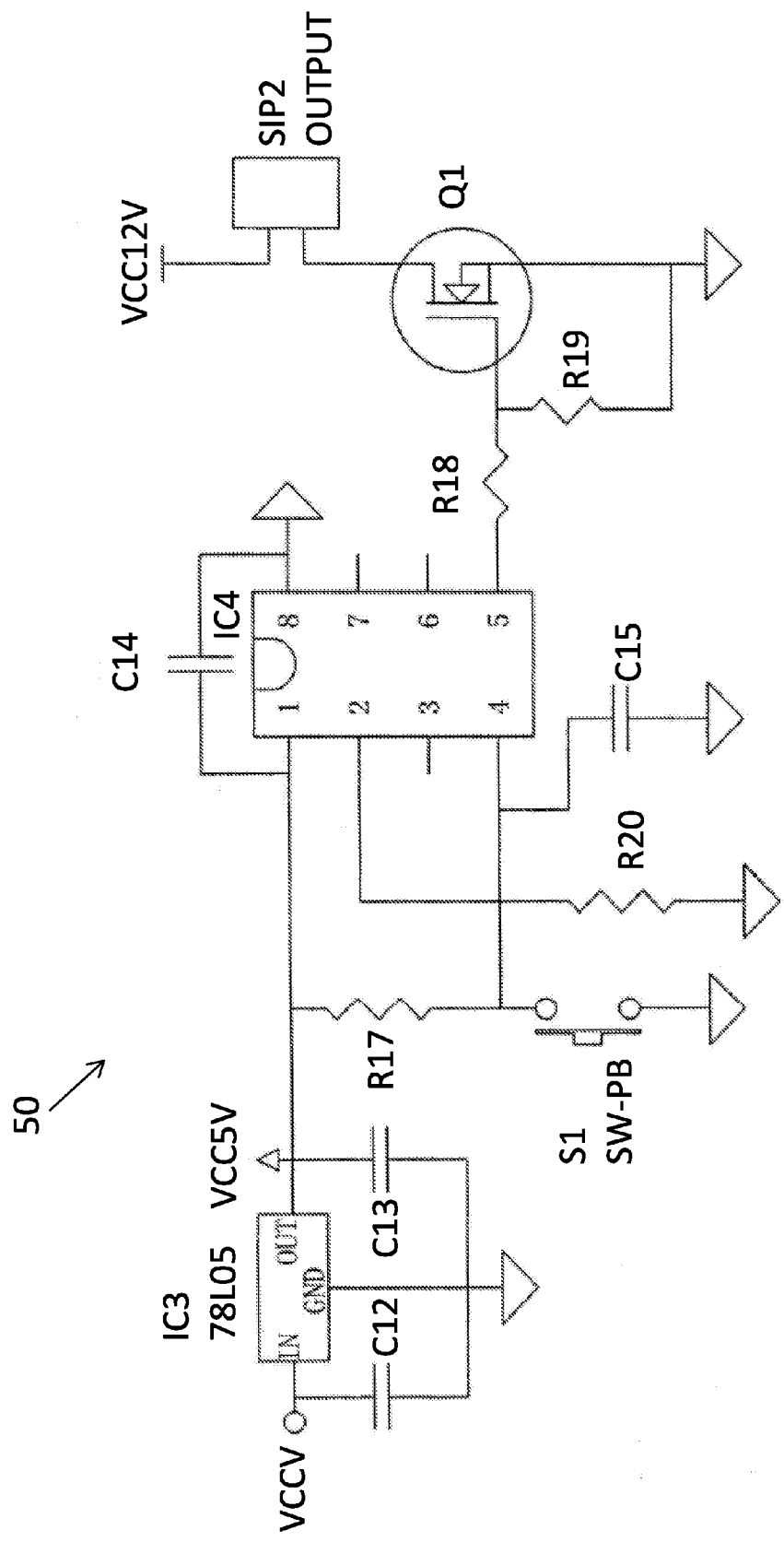
FIG. 5 is a circuit diagram illustrating a dimming control circuit according to one embodiment of the present invention.

As shown in FIG. 5, according to one embodiment of the present invention, the dimming control circuit 50 includes the sequentially connected blocks including a 3-terminal integrated voltage regulator IC3, a dimming controller IC4, and a metal oxide semiconductor (MOS) transistor Q1 coupled to the load output terminal SIP2, along with peripheral basic electronic parts. The three-terminal positive regulator (or three-terminal integrated voltage regulator) IC3 converts the power VCC to the working voltage required by the dimming controller IC4 (e.g., 5V) and through the conduction arising from the control of the MOS transistor Q1 by the dimming controller IC4, the load output of the power supply to the light (e.g., an LED light bulb) is supplied through the load output terminal SIP2.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A power supply circuit comprising:
an anti-electromagnetic interference circuit configured to receive input alternating current power and to output filtered alternating current power;
a rectifier circuit configured to rectify the filtered alternating current power;
a current correction circuit configured to perform passive power factor correction on the rectified alternating current power;
a single-ended flyback converter circuit coupled to the output of the current correction circuit, the single-ended flyback converter circuit comprising:
a power supply controller;
an output transformer coupled to the power supply controller;
a secondary transformer coupled to the output transformer; and
an optocoupler coupled between the power supply controller and the secondary transformer; and
a dimming control circuit coupled between the output of the single-ended flyback converter circuit and a light load, the dimming control circuit being coupled to the secondary transformer,
wherein the current correction circuit is configured to control a waveform of the rectified alternating current power to follow a current output to the light load in order to provide passive power factor correction.

2. The power supply circuit of claim 1, wherein the single ended flyback converter circuit further comprises an RCD snubber circuit coupled between the current correction circuit and the output transformer and coupled to the power supply controller.

3. The power supply circuit of claim 2, wherein the RCD snubber circuit comprises:
a first resistor;
a second resistor;
a capacitor; and
a diode,
wherein the first resistor, the second resistor, and the capacitor are coupled in parallel between the current correction circuit and a cathode of the diode of the RCD snubber circuit, and
wherein an anode of the diode of the RCD snubber circuit is coupled to the power supply controller.

4. The power supply circuit of claim 1, wherein the current correction circuit comprises:
a first discharge circuit comprising a first electrolytic capacitor coupled in series with a first diode and a first node between the first electrolytic capacitor and the first diode;
a second discharge circuit comprising a second electrolytic capacitor coupled in series with a second diode and a second node between the second electrolytic capacitor and the second diode, the first discharge circuit and the second discharge circuit being coupled in parallel across an output of the rectifier circuit; and
a third diode coupled between the first node and the second node.

5. A power supply circuit comprising:
an anti-electromagnetic interference circuit configured to receive input alternating current power and to output filtered alternating current power;
a rectifier circuit configured to rectify the filtered alternating current power;
a current correction circuit configured to perform passive power factor correction on the rectified alternating current power;
a single-ended flyback converter circuit coupled to the output of the current correction circuit; and
a dimming control circuit coupled between the output of the single-ended flyback converter circuit and a light load, the dimming control circuit comprising:
a three-terminal integrated voltage regulator;
a dimming controller coupled to the three-terminal integrated voltage regulator;
a MOS transistor; and
a load output terminal,
wherein the current correction circuit is configured to control a waveform of the rectified alternating current power to follow a current output to the light load in order to provide passive power factor correction.

6. The power supply circuit of claim 5,
wherein the single-ended flyback converter circuit comprises:
a power supply controller;
an output transformer coupled to the power supply controller;
a secondary transformer coupled to the output transformer; and
an optocoupler coupled between the power supply controller and the secondary transformer,
wherein the dimming control circuit is coupled to the secondary transformer, and
wherein the single-ended flyback converter circuit further comprises an RCD snubber circuit coupled between the current correction circuit and the output transformer and coupled to the power supply controller.

7. The power supply circuit of claim 6, wherein the RCD snubber circuit comprises:
a first resistor;
a second resistor;
a capacitor; and
a diode,
wherein the first resistor, the second resistor, and the capacitor are coupled in parallel between the current correction circuit and a cathode of the diode of the RCD snubber circuit, and
wherein an anode of the diode of the RCD snubber circuit is coupled to the power supply controller.

8. The power supply circuit of claim 5, wherein the current correction circuit comprises:
a first discharge circuit comprising a first electrolytic capacitor coupled in series with a first diode and a first node between the first electrolytic capacitor and the first diode;
a second discharge circuit comprising a second electrolytic capacitor coupled in series with a second diode and a second node between the second electrolytic capacitor and the second diode, the first discharge circuit and the second discharge circuit being coupled in parallel across an output of the rectifier circuit; and a third diode coupled between the first node and the second node.

* * * * *